(12) United States Patent
Yanke et al.

(10) Patent No.: US 12,108,704 B2
(45) Date of Patent: Oct. 8, 2024

(54) AGRICULTURAL HEADER REEL POSITION CONTROL BASED ON HEADER WING POSITION

(71) Applicant: DEERE & COMPANY, Moline, IL (US)

(72) Inventors: Bryan R. Yanke, Eldridge, IA (US); Duane M. Bomleny, Geneseo, IL (US)

(73) Assignee: Deere & Company, Moline, IL (US)

( * ) Notice: Subject to any disclaimer, the term of this patent is extended or adjusted under 35 U.S.C. 154(b) by 605 days.

(21) Appl. No.: 17/324,571

(22) Filed: May 19, 2021

(65) Prior Publication Data

US 2022/0369556 A1  Nov. 24, 2022

(51) Int. Cl.
*A01D 41/14* (2006.01)
*A01D 57/04* (2006.01)

(52) U.S. Cl.
CPC ......... *A01D 41/141* (2013.01); *A01D 41/144* (2013.01); *A01D 41/145* (2013.01); *A01D 57/04* (2013.01)

(58) Field of Classification Search
CPC .... A01D 41/141; A01D 41/144; A01D 57/04; A01D 34/28; A01D 34/286
See application file for complete search history.

(56) References Cited

U.S. PATENT DOCUMENTS

| 3,208,208 | A | 9/1965 | Schatz |
| 4,124,970 | A | 11/1978 | Bernhardt |
| 4,204,383 | A | 5/1980 | Milliken, Jr. |
| 7,874,132 | B2 * | 1/2011 | Sauerwein ........... A01D 41/141 56/10.2 E |
| 9,795,083 | B2 * | 10/2017 | Van Vooren ........... A01B 73/06 |
| 10,595,462 | B2 * | 3/2020 | Hunt ..................... A01D 41/141 |
| 11,224,165 | B2 * | 1/2022 | Cook ................... A01D 41/127 |
| 2007/0204583 | A1 * | 9/2007 | Coers ................... A01D 61/002 56/14.4 |
| 2009/0107094 | A1 | 4/2009 | Bich et al. |
| 2018/0338418 | A1 * | 11/2018 | Ricketts ................. A01D 41/14 |
| 2019/0003495 | A1 * | 1/2019 | Hunt .................... A01D 57/04 |
| 2019/0003496 | A1 * | 1/2019 | Hunt .................... A01B 63/10 |
| 2019/0053429 | A1 * | 2/2019 | Cook ................... A01D 41/127 |

(Continued)

FOREIGN PATENT DOCUMENTS

| BR | 102018013468 A2 * | 1/2019 | ............ A01D 41/14 |
| BR | 102020025233 A2 * | 7/2021 | ........... A01D 41/141 |

(Continued)

OTHER PUBLICATIONS

FlexDraper Header and Float Module for Combines, dated Jan. 2021, pp. 539-565.

(Continued)

*Primary Examiner* — Adam J Behrens
*Assistant Examiner* — Ashley A Kaercher

(57) ABSTRACT

Systems, methods, and apparatuses for automatically controlling a position of a reel relative to wing of an agricultural header in response to movement of the wing are disclosed. In some instances, a position of the reel, such as a portion of the reel, is located at a different position relative to the wing based on an amount of articulation of the wing, such as an amount of angular displacement of the wing relative to a datum, such as a center frame of the header.

2 Claims, 6 Drawing Sheets

(56) References Cited

U.S. PATENT DOCUMENTS

| | | | |
|---|---|---|---|
| 2019/0082603 A1* | 3/2019 | Farley | A01D 61/02 |
| 2019/0110403 A1* | 4/2019 | Braet | A01D 41/14 |
| 2019/0230857 A1* | 8/2019 | Thomson | A01D 41/141 |
| 2020/0390035 A1* | 12/2020 | Hunt | A01D 41/141 |
| 2021/0185880 A1* | 6/2021 | Martin | A01D 41/145 |
| 2021/0185917 A1* | 6/2021 | Hunt | G05B 15/02 |
| 2021/0185918 A1* | 6/2021 | Hunt | A01D 57/12 |
| 2021/0185919 A1* | 6/2021 | Hunt | A01D 41/127 |
| 2022/0264798 A1* | 8/2022 | Martin | A01D 41/141 |
| 2022/0369556 A1* | 11/2022 | Yanke | A01D 57/04 |

FOREIGN PATENT DOCUMENTS

| | | | | |
|---|---|---|---|---|
| BR | 102022003747 A2 * | 11/2022 | | A01D 41/141 |
| EP | 1867228 A1 | 12/2007 | | |
| EP | 3311646 A1 * | 4/2018 | | A01B 73/044 |
| EP | 3560314 A1 * | 10/2019 | | A01D 34/283 |
| EP | 3888432 A1 * | 10/2021 | | A01D 41/141 |
| EP | 3888444 A1 * | 10/2021 | | A01D 41/127 |
| WO | WO-2014025346 A1 * | 2/2014 | | A01D 41/141 |
| WO | WO-2020185873 A1 * | 9/2020 | | A01B 63/111 |
| WO | WO-2021133674 A1 * | 7/2021 | | A01D 41/141 |

OTHER PUBLICATIONS

Chapter 5.13 from MacDon Service and Maintenance Manual for FD1 Series and FM100, Operator's manual—215546 Revision A, dated Jan. 2021, pp. 1-666.

* cited by examiner

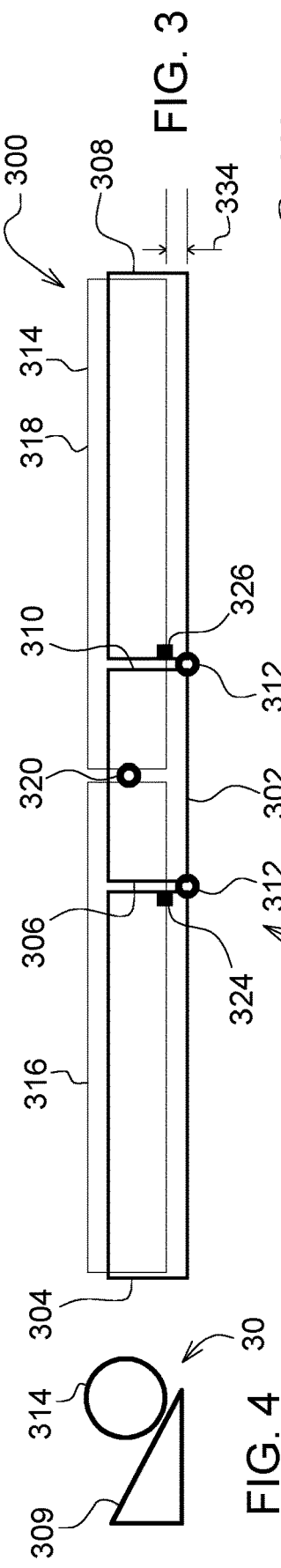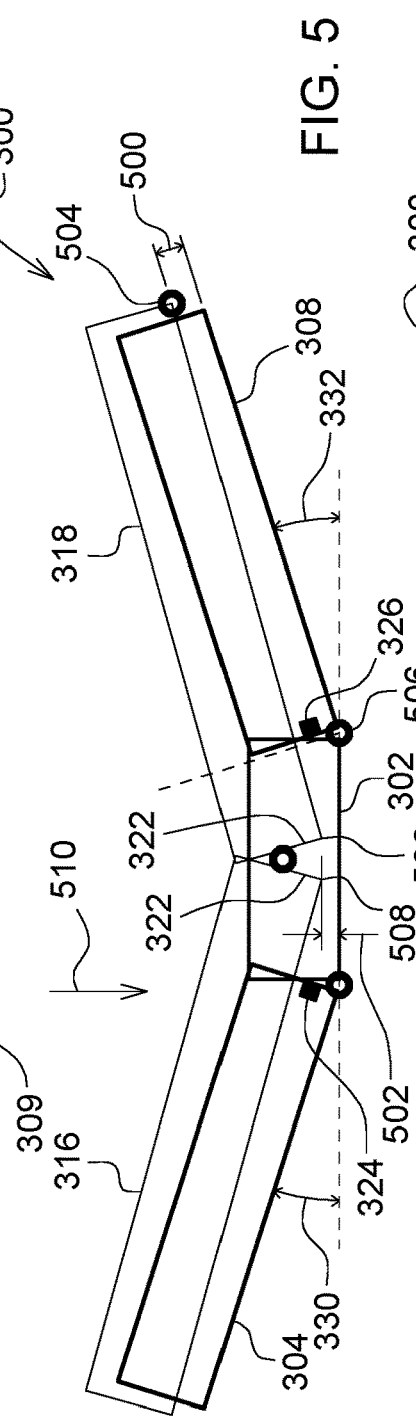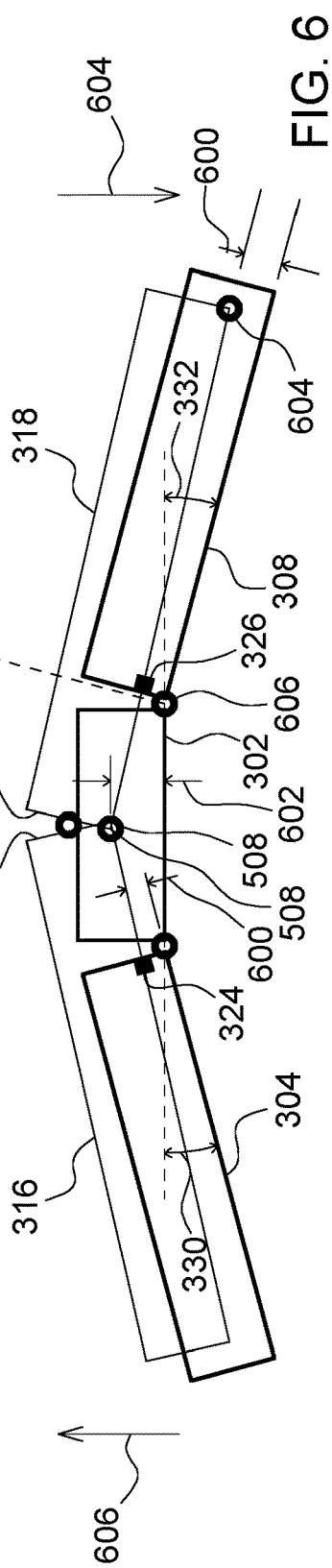

AGRICULTURAL HEADER REEL POSITION CONTROL BASED ON HEADER WING POSITION

FIELD OF THE DISCLOSURE

The present disclosure relates generally to agricultural implements and, particularly, to draper headers that include reels.

BACKGROUND OF THE DISCLOSURE

Agricultural harvesters, such as combine harvesters, forage harvesters, and windrowers, utilize agricultural implements, such as a header. In the context of combine harvesters, a header is attached to a feederhouse. Some headers, such as a draper header, includes a base assembly that supports a cutterbar and a reel. As the combine harvester travels, the header engages and severs crop and transfers the severed crop into the combine harvester for further processing. The reel rotates to guide the incoming crop into engagement with the cutterbar to sever the incoming crop and to bias the severed crop onto the base assembly for subsequent transportation.

Generally, draper headers include a flat, wide belt, referred to as a draper or draper belt, to convey crop material. The arrangement and number of belts included on a draper header can vary. In some instances, draper headers include two side draper belts that convey crop material laterally, to a center of the draper header, where a center feed belt moves the crop material longitudinally into the feederhouse of the combine harvester. Generally, each belt is wrapped around a pair of rollers, where one of the rollers is a drive roller and the other roller operates as an idler roller.

SUMMARY OF THE DISCLOSURE

A first aspect of the present disclosure is directed to a system for adjusting a position of a reel of a draper header to maintain a desired clearance between a portion of the reel and another portion of the draper header. The system includes a draper header. The draper header may include a base assembly; a cutterbar extending along a leading edge of the base assembly; and a reel pivotally coupled to the base assembly. The base assembly may include a frame portion and a first wing pivotably coupled to the frame portion. The first wing may be moveable over a range of movement, the range of movement having a first end and a second end. The reel may include a finger and a first reel portion. The first reel portion may be automatically movable by a first amount relative to the first wing in response to a first sensed position of the first wing and automatically movable by a second amount relative to the first wing, different than the first amount, in response to a second sensed position of the first wing, different that the first sensed position of the first wing.

A second aspect of the present disclosure is directed to a method for adjusting a position of a reel of a draper header in response to movement of one or more wings of the draper header. The method may include sensing, with a wing position sensor, a position of a wing of a draper header, the wing moveable within a range of movement, the range of movement defined between a first end point and a second end point; automatically actuating an actuator to move a portion of a reel to a first position relative to the wing when the sensed position of the first wing is at a first location within the range of movement; and automatically actuating an actuator to move the portion of the reel to a second position relative to the wing, the second position different than the first amount, when the sensed position of the wing is at a second location within the range of motion, different than the first location.

The various aspects of the present disclosure may include one or more of the following features. The second amount of movement may be greater than the first amount of movement. The second sensed position of the first wing may be closer to the second end of the range of movement than the first sensed position of the first wing. The first end of the range of movement may be a bump position. The second end of the range of movement may be a droop position. As a sensed position of the first wing approaches the droop position, an amount of movement of the first reel portion relative to the first wing may increase. The range of movement may include a plurality of intervals. Each interval may include a plurality of wing positions within the range of movement. The first sensed position may include a first plurality of positions that form a first interval of the plurality of intervals. The second sensed position may include a second plurality of positions that form a second interval of the plurality of intervals. The reel may be automatically moved by the first amount relative to the first wing when the first sensed position is any of the first plurality of positions within the first interval. The reel may be automatically moved by the second amount relative to the first wing when the second sensed position is any of the second plurality of positions within the second interval. Intervals may be defined in a lookup table. The base assembly may include a second wing pivotably coupled to the frame portion and moveable over the range of movement. The first wing may be disposed at a first side of the frame portion, and the second wing may be disposed at a second side of the frame portion, opposite the first side. The first wing and the second wing may be independently movable relative to each other. The reel may include a second reel portion. The second reel portion may be automatically movable by the first amount relative to the second wing in response to a first sensed position of the second wing. The second reel portion may be automatically movable by the second amount relative to the second wing in response to a second sensed position of the second wing, different that the first sensed position of the second wing. The first reel portion and the second reel portion may be independently moveable relative to each other. The first reel portion may be automatically movable in response to changes in a sensed position of the first wing, and the second reel portion may be automatically movable in response to changes in a sensed position of the second wing.

The various aspects of the present disclosure may include one or more of the following features. The draper header may include a first reel arm disposed at an outboard end of the first wing; a second reel arm disposed at an outboard end of the second wing, the second reel arm; and a third reel arm disposed between the first reel arm and the second reel arm. The first reel arm may couple the first wing and the first reel portion. The second reel arm may couple the second wing and the second reel portion. The third reel arm may couple to both the first reel portion and the second reel portion. The first reel arm, the second reel arm, and the third reel arm may be actuatable independently of each other to move the first reel portion and the second reel portion independently of each other. The first reel arm and the second reel arm may be actuatable independently to alter a position of the first reel portion and the second reel portion to move the first reel portion and the second reel portion, respectively, by different amounts in response to changes in a sensed position of the first wing and a sensed position of the second wing, respectively, during an agricultural operation. The third arm may automatically position inboard ends of the first reel portion and the second reel portion located adjacent to the third arm towards the frame portion when the first wing or the second wing is in a droop condition. The third arm may automatically position inboard ends of the first reel portion and the second reel portion adjacent to the third arm away from the frame portion when the first wing and the second wing are in a bump condition.

Additionally, the various aspects of the present disclosure may include one or more of the following features. The actuator may be coupled to a reel arm that extends between the wing and the portion of the reel. The range of movement may include a plurality of intervals. Automatically actuating an actuator to position a portion of a reel to a first position relative to the wing when the sensed position of the first wing is at a first location within the range of movement may include automatically actuating the actuator to move the portion of the reel to the first position when the sensed position of the wing is any of a first plurality of positions within a first interval of the plurality of intervals. Automatically actuating an actuator to position the portion of the reel to a second position relative to the wing, different than the first amount, when the sensed position of the wing is at a second location within the range of motion, different that than the first location, may include automatically actuating the actuator to move the portion of the reel to the second position when the sensed position of the wing is any of a second plurality of positions within a second interval of the plurality of intervals. At least one of the first position or the second position may be determined. Determining at least one of the first position or the second position may include comparing the sensed position of the wing to the plurality of intervals; determining an interval of the plurality of intervals that encompasses the sensed position; and identifying a position to which the portion of the reel is to be moved relative to the wing associated with the determined interval. A control signal to instruct the actuator to move the portion of the reel to the identified position may be generated. The identified position may define one of the first position or the second position. Identifying the position to which the portion of the reel is to be moved relative to the wing associated with the determined interval may include sensing a position of the portion of the reel; comparing the sensed position of the wing to the sensed position of the portion of the reel; and determining an amount by which the portion of the reel is to be moved relative to the wing based on the comparison in order to position the portion of the reel at the identified position.

Other features and aspects will become apparent by consideration of the detailed description and accompanying drawings.

BRIEF DESCRIPTION OF THE DRAWINGS

The detailed description of the drawings refers to the accompanying figures in which:

FIG. 3 is a schematic view of an example draper header, according to some implementations of the present disclosure.

FIG. 4 is a side view of the example draper header of FIG. 3.

FIG. 5 is another front view of the example draper header of FIG. 3 in which wings of the draper header are in a bump position.

FIG. 6 is another front view of the example draper header of FIG. 3 in which wings of the draper header are in a droop position.

DETAILED DESCRIPTION

Figure 1:
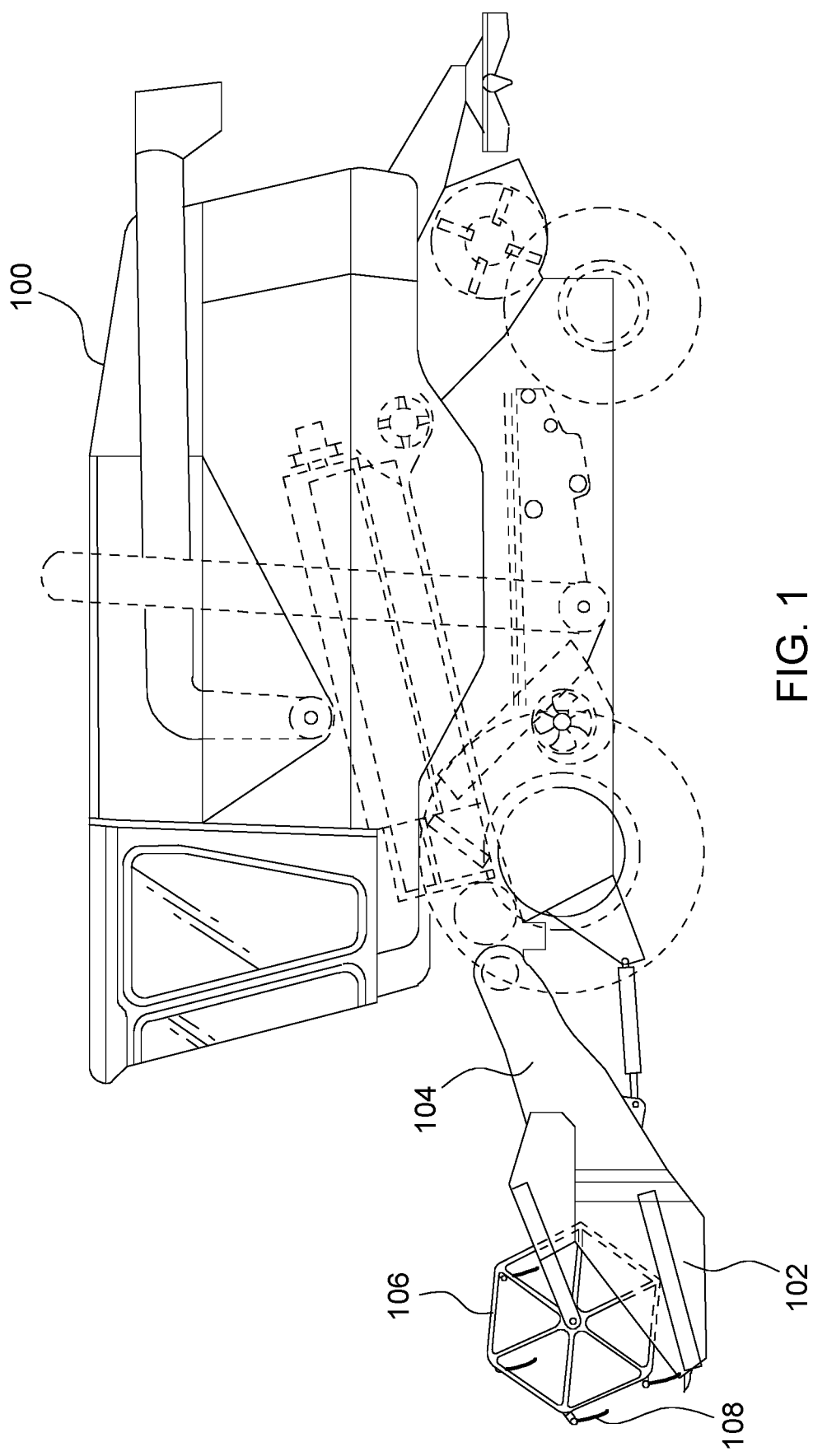
FIG. 1 is a side view of an example combine harvester that has an example draper header coupled thereto, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to agricultural implements and, more particularly, to draper headers having reel arms whose positions are automatically controlled based on a position of the wings of the draper header. For example, the present disclosure encompasses draper headers with reel arms that are automatically positioned at a location to provide selective clearance between fingers of the reel and a cutterbar of the draper based a position of a wing of the draper header. In some instances, the reel arms operate in unison to define the clearance between the reel fingers and the cutterbar, where the clearance to be formed is defined according to which of the wings has a greater amount of droop or a lesser amount of bump. In other implementations, the reel arms operate independently to form different clearances between the reel and wings of the draper head depending upon the amount of articulation of each wing. Still further, the present disclosure encompasses independently controlling a center reel arm to reduce an amount of clearance between the reel fingers and the cutterbar when one or both of the draper wings are in a bump condition or increase an amount of clearance between the reel fingers and the cutterbar when one or both of the wings are in a droop condition.

Figure 2:
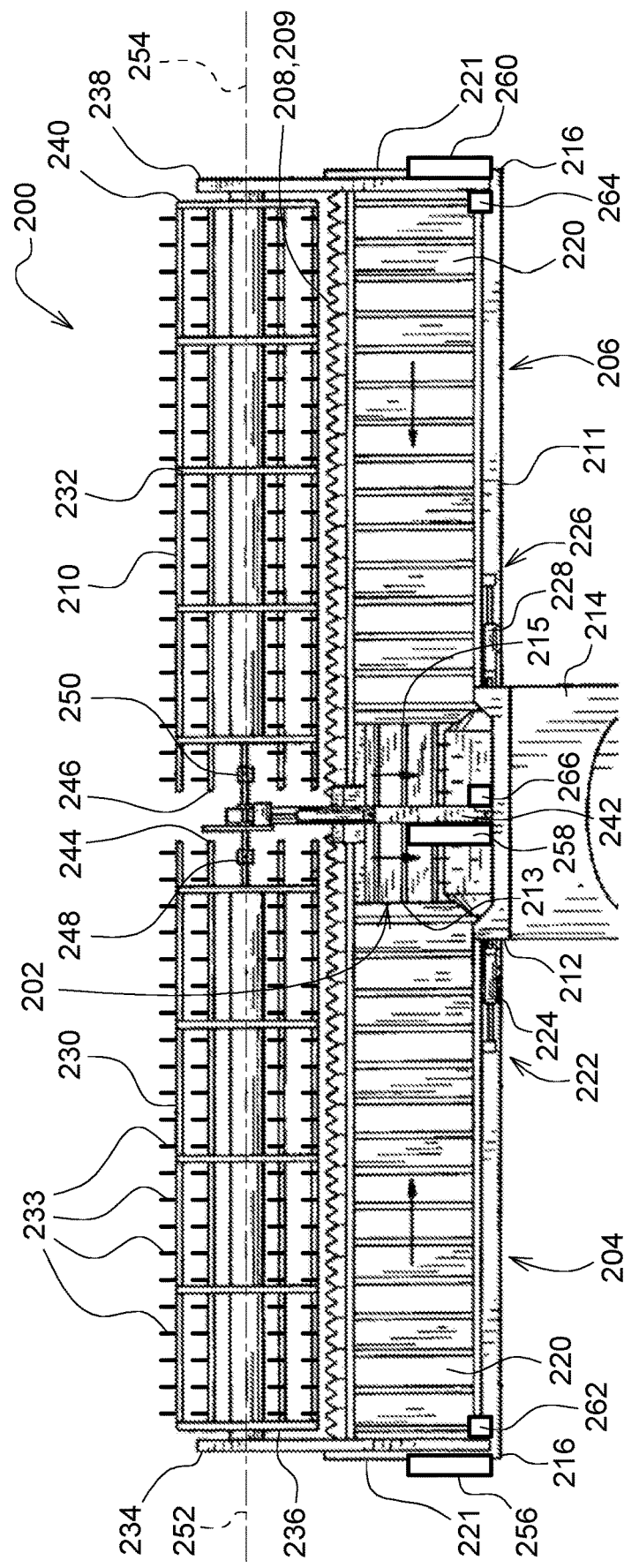
FIG. 2 is a top view an example draper header, according to some implementations of the present disclosure.

FIG. 1 is a side view of a combine harvester 100 and a draper header 102 attached at the feederhouse 104 of the combine harvester 100. The draper header 102 includes a reel 106 that includes a plurality of fingers 108 that engage crop as the crop comes into contact with the draper header 102. FIG. 2 is a top view of an example draper header 200 that may be similar to the draper header 102. The draper header 200 includes a base assembly 211 that includes a center frame portion 202, a first wing 204, and a second wing 206. The draper header 200 also includes a cutterbar 208 that extends along a leading edge 209 of the base assembly 211 and a reel 210. The center frame portion 202 includes, or is attached to, a header main frame 212, and the first and second wings 204 and 206 are pivotably coupled to opposing sides 213 and 215, respectively, of center frame portion 202. The center frame portion 202 also includes a center endless belt 217. In some implementations, the header main frame 212 is attached to feederhouse 214 via an attachment frame, and a float cylinder couples the header main frame 212 and the attachment frame. The attachment frame and float cylinder provide a type of suspension to the draper header 200. Although shown with three platform sections (i.e., the center frame portion and wings 204 and 206), in some instances, the draper head 200 includes additional or fewer platform sections, depending upon the particular application. The center endless belt 217 conducts severed crop material to the feederhouse 214.

Each of the first and second wings 204 and 206 includes a frame 216, a plurality of arms coupled with the respective frame 216, an endless belt 220, and a plurality of belt guides. The endless belts 220 conduct severed crop material towards the center endless belt 217. As explained earlier, the cutterbar 208 extends along the leading edge 209 of the draper header 200, spanning across both of the first and second wings 204 and 206, and includes a plurality of knives that operate to sever crops. The type of knife included on the cutterbar 208 can vary. For example, the knife types include a single blade knife or a double blade knife. The present disclosure covers headers that include a cutterbar that is flexible to provide a desired degree of flexure across the width of draper header. Headers that include flexible cutterbars are generally moveable between a flexible condition in which the cutter bar is capable of following a contour of the ground and a rigid configuration in which the cutterbar is prevented from following the contour of the ground. Headers that contain a rigid cutterbar, that is a cutterbar not convertible between a rigid configuration and a flexible configuration are also within the scope of the present disclosure.

The frames 216 of first wing 204 and the second wing 206 are each pivotably coupled with center frame portion 202, such that outboard ends 221 of first wing 204 and second wing 206 are moveable vertically up and down between a full bump position and a full droop position, and the first and second wings 204 and 206 are moveable independent from center frame portion 202.

The wings 204 and 206 include float force assemblies 222 and 226, respectively. The float force assemblies 222 and 226 include float cylinders 224 and 228, respectively. The actuators 224 and 228 apply a float force to the respective wings 204 and 206 that assists in raising the wing relative to the center frame portion 202. For example, the float force assemblies 222 and 226 assist in raising the wings 204 and 206 in response to an upwardly directed force imparted to the wings 204 and 206. The force may be the result of, for example, an impact with an obstacle. Consequently, the float cylinders 224 and 228 (and the associated float force assemblies 222 and 226 more generally) act as suspension systems to absorb some of the impact and allow the wings 204 and 206 to rise above the obstacle. The weight of the wings 204 and 206 acts against the float force and operates to return the wings 204 and 206 to a ground-following position. In the illustrated example, the float cylinder 224 of the float force assembly 222 is attached to the frame 216 of first wing 204. Similarly, the float cylinder 228 of the float force assembly 226 is attached to the frame 216 of second wing 206. In some instances, each float cylinder 224 and 228 is fluidically coupled to a respective accumulator by hydraulic (or other fluid) circuitry.

The reel 210 includes a first reel portion 230 and a second reel portion 232. The reel 210 includes a plurality of fingers 233. In some implementations, fingers 233 are included on both the first reel portion 230 and the second reel portion 232. The reel 210 is pivotably coupled to the base assembly 211 by a plurality of reel arms. A first reel arm 234 is coupled to an outboard end 236 of the first reel portion 230; a second reel arm 238 is coupled to an outboard end 240 of the second reel portion 232; and a third reel arm 242 is coupled to inboard ends 244 and 246 of the first and second reel portions 230 and 232. The reel arms 234, 238, and 242 operate to raise and lower the first and second reel portions 230 and 230 relative to the base assembly 211, e.g., relative to the center frame portion 202, the first wing 204, and the second wing 206. Further, the first and second reel portions 230 and 232 are coupled to the third reel arm 242 by pivotable joints 248 and 250 at the respective inboard ends 244 and 246. The pivotable joints 248 and 250 allow the first and second reel portions 230 and 232 to both rotate about respective centerlines 252 and 254 as well as pivot relative to the third arm 242. The first reel portion 230 is associated with the first wing 204 as a result of being coupled thereby by the first reel arm 234. The second reel portion 232 is associated with the second wing 206 as a result of being coupled thereby by the second reel arm 238.

The first reel arm 234 is actuated by a first actuator 256. The second reel arm 238 is actuated by a second actuator 260, and the third reel arm 242 is actuated by a third actuator 258. The first, second, and third actuators 256, 258, and 260 are independently operable to raise the associated reel arms independently of the other reel arms. In some implementations, the first, second, and third actuators 256, 258, and 260 are hydraulic actuators, such hydraulic cylinders. In other implementations, the first, second, and third actuators 256, 258, and 260 are other types of actuators, such as mechanical actuators, pneumatic actuators, or electrical actuators. Further, in some implementations, one or more of the first, second, and third actuators 256, 258, and 260 are of a different type of actuator than one or more of the others of the first, second, and third actuators 256, 258, and 260.

The draper header 200 also includes reel arm sensors 262, 264, and 266 that sense a position of the reel arms 234, 238, and 242, respectively. In some implementations, the position information sensed by the reel arm sensors 262, 264, and 266 is used to control a position of the reel arms 234, 238, and 242, respectively, in order to define a clearance between the reel portions 230 and 232 and the respective wings 204 and 206.

FIG. 3 is a schematic view of an example draper header 300. FIG. 3 shows a front view of the draper header 300 with wings 304 and 308 in a neutral position. FIG. 4 is a side view of the draper header 300. FIGS. 5 and 6 are schematic views showing the draper header 300 in a bump (e.g., full bump) configuration and a droop (e.g., full droop) configuration, respectively. Reel arms that support reel portions 316 and 318 are omitted for clarity. Positions of the reel arms (not shown) relative to the wings 304 and 308 (in the case of the outboard reel arms) and center frame portion 302 (in the case of the centrally located reel arm) that support the reel portions 316 and 318 are unchanged across FIGS. 3, 4, and 5.

Referring to FIG. 3, similar to the draper header 200, the example draper header 300 includes a center frame portion 302, the first wing 304 pivotably coupled to a first side 306 of the center frame portion 302, and a second wing 308 pivotably coupled to a second side 310 of the center frame portion 302. The first wing 304 and the second wing 308 are pivotably coupled to the center frame portion 302 by hinges 312. As a result of this arrangement, the first and second wings 302 and 308 are able move into a droop configuration or position (as shown in FIG. 5) or a bump configuration or position (as shown in FIG. 6). The center frame portion 302, the first wing 304, and the second wing 308 (collectively referred to as "base assembly 309") may be similar to the center frame portion 202, the first wing 304, and the second wing 206, respectively. As a result, the base assembly 309 includes three pivotably coupled sections.

The draper header 300 also includes a first wing position sensor 324 that detects a position of the first wing 304 and a second wing position sensor 326 that detects a position of the second wing 308. In some implementations, the first wing position sensor 324 and 326 detect an angular displacement of first wing 304 and the second wing 308, respectively. Thus, in some instances, the first and second wing position sensor 324 and 326 detect an amount of angular displacement of the first and second wings 304 and 308, respectively, relative to the center frame portion 302. For example, the first wing position sensor 324 measures angle 330 defined between the first wing 304 and the center frame portion 302, and the second wing position sensor measures the angle 332 defined between the second wing 308 and the center frame portion 302.

The draper header 300 also includes a reel 314, which may be similar to reel 210. The reel 314 includes a first reel portion 316 and a second reel portion 318 that are pivotably connected at a pivotable hinge 320. Similar to the reel 210, the reel 314 is movable relative to the base assembly 309 by reel arms, not shown, which may be similar to reel arms 234, 238, and 242. In a manner similar to that described earlier, the first and second reel portions 316 and 318 are raisable and lowerable relative to the base assembly 309.

The first reel portion 316 is coupled to the first wing 304 via one of the reel arms. Thus, as the first wing 304 moves, such as in bump or droop, the first reel portion 316 also moves as a result of the connection provided by the associated reel arm. The second reel portion 318 is similarly coupled to the second wing 308. The reel arms provide for displacing the reel portions 316 and 318 relative to the associated wings 304 and 308 to which the reel portions 316 and 318 are respectively attached. Further, the first and second reel portions 316 and 318 are independently moveable from each other by independent actuation of the reel arms coupling each of the reel portions 316 and 318 to the respective wings 304 and 308.

Further, as the draper header 300 is transported over the ground, the first and second wings 304 and 308 follow a contour of the ground. As the first and second wings 304 and 308 follow the ground contour, the first and second wings 304 and 308 pivot about hinges 312. The hinges 312 permit the first and second wings 304 and 308 to move within a range of bump positions (one of which is shown, for example, in FIG. 5) or a range of droop positions (one of which is shown, for example, in FIG. 6). The first and second wings 304 and 308 are permitted to move within the range of bump positions and the range of droop positions as the contour of the ground changes. Thus, the draper head 300 is configured to permit the first and second wings 304 and 308 to follow the contour of the ground. Further, although FIGS. 5 and 6 show both of the first and second wings 304 and 308 in bump and droop, respectively, the first and second wings 304 and 308 are movable such that one wing can be in bump while the other wing is in droop.

Because the first and second reel portions 316 and 318 represent fewer machine segments than the first and second wings 304 and 308 and central frame portion 302 of the base assembly 309 and because the first and second reel portions 316 and 318 extend laterally beyond the locations of the hinges 312, articulation of the first and second wings 304 and 308 and, hence, the first and second reel portions 316 and 318, as the draper header 300 moves across the ground causes a clearance between the reel portions 316 and 318 and the wings 304 and 308 and a clearance between the wings 304 and 308 and the central frame portion 302 to change for a given position of the reel arms. As a consequence, a clearance between fingers provided on the first and second reel portions 316 and 318 and a cutterbar, which may be similar to cutterbar 208 of the draper header 200, also changes for a given position of the reel arms.

For example, the outboard reel arms, such as reel arms 234 and 238, shown in FIG. 2, are coupled to the corresponding wings, such as wings 204 and 206, respectively, in the case of the draper header 200 of FIG. 2. Consequently, for a given position of the outboard reel arms relative to the corresponding wings, the clearance between the reel portions and the wing at the outboard position where the reel arm couples to the wing remains constant notwithstanding an amount of bump or droop experienced by the wing. However, as shown in FIGS. 5 and 6, for a given position of the reel arms, a clearance between the reel portion and the cutterbar varies along a length of the reel portion.

FIG. 5 shows the example header 300 in which both the first and second wings 304 and 308 have moved into identical bump positions. As shown in FIG. 5, a clearance 500 between the reel portions 316 and 318 and the wing associated therewith corresponds to locations where the outboard reel arms supporting the reel portions 316 and 318 couple to the respective wings 304 and 308 remains the same as a clearance 334 between the reel portions 316 and 318 and the associated wings 304 and 308, respectively. Clearance 600, shown in FIG. 6, is similarly the same as the clearance 334.

Along the length of the reel portions 316 and 318, the clearance between the reel portions 316 and 318 and the associated wings 304 and 308, respectively, varies. In the context of FIG. 5, a clearance between the reel portions 316 and 318 and the associated wings 304 and 308 increases from the clearance 500 at outboard position 504 to a position 506 that is adjacent to the hinge 312. A dashed line is shown extending from the position 506. The clearance at positions 506 corresponds to a maximum clearance between the reel portions 316 and 318 and the associated wings 304 and 308 at the illustrated bump condition. The clearance between the reel portions 316 and 318 and the associated wings 304 and 308 decreases inwardly beyond positions 506 to the clearance 502 at the inboard ends 322 of the reel portions 316 and 318. It is noted, however, that the clearance 502 is not the same as the clearance 334, because, as the reel portions 316 and 318 pivot about the pivotable hinge 320, the corners 508 lower, decreasing the clearance between the reel portions 316 and 318 and the center frame portion 302. These changes in clearance between the reel portions 316 and 318 and the wings 304 and 308 and the center frame portion 302 also correspondingly change the clearance between fingers provided on the reel portions 316 and 318 and a cutterbar of the draper header 200.

FIG. 6, on the other hand, shows the wings 304 and 308 and, hence, the reel portions 316 and 318 moved into identical droop positions. Again, along the length of the reel portions 316 and 318, the clearance between the reel portions 316 and 318 and the associated wings 304 and 308, respectively, varies. In the context of FIG. 6, a clearance between the reel portions 316 and 318 and the associated wings 304 and 308 decreases from an outboard positions 604 to a position 606 that is adjacent to the hinge 312. A dashed line is shown extending from the position 606. The clearance at positions 606 represents a minimum clearance between the reel portions 316 and 318 and the associated wings 304 and 308 at the illustrated droop condition. The clearance between the reel portions 316 and 318 and the associated wings 304 and 308 increases inwardly beyond positions 606 to the clearance 502 at the inboard ends 322 of the reel portions 316 and 318. It is noted, that the clearance 602 is not the same as the clearance 334, because, as the reel portions 316 and 318 pivot about the pivotable hinge 320, the corners 508 raise, increasing the clearance between the reel portions 316 and 318 and the center frame portion 302.

Because of the changes in clearances between the reel portions 316 and 318 and the wings 304 and 308 and the reel portion 316 and 318 and the center frame portion 302 as a result of changes in the position of the wings 304 and 308 as the wings 304 and 308 track the contour of the ground, there is a risk, for example, that the fingers of the reel portions 316 and 318 will come into contact with the cutterbar of the draper header 300. Such contact could result in one or more of the fingers becoming severed or damaged by the cutterbar, thereby damaging the reel 314 and diminishing the effectiveness of the reel 314 in drawing crops towards the draper header 300.

Generally, the reel arms of current draper headers act together. Thus, in order to avoid this type of contact and resulting damage in the context of current draper headers, a position at which the reel portions are located relative to the wings (referred to as "reel position") is selected to account for when the clearance between the reel portions and the cutterbar is the least, which corresponds to the wings and, consequently, the reel portions being in a full droop position. A full droop position represents a maximum amount of droop that the wings can articulate. However, by selecting the reel position in this way, the clearance between the reel portions and the wings increases as the wings are moved away from the full droop position, with the clearance increasing as the wings are moved in the neutral position or are moved into a bump position. As a result, the effectiveness of the reel in pulling crop towards the cutterbar and onto the belts of the draper header is diminished due to the increased clearance between the wings and the reel portions. As a result, the effectiveness of the draper header is diminished during a harvesting operation.

To overcome this disadvantage, the present disclosure provides for controlling the positions of the reel arms, including independently, and varying a position of the reel portions relative to the associated wing of a draper header, thereby altering clearances therebetween, in response to movement of the wings, such as during a harvesting operation. As a result, harvesting performance of a draper header is improved even as the wings of a draper header are pivotably articulated in response to following a contour of the ground. By independently controlling the reel arms to adjust a clearance between the reel portions and the wings, an amount of clearance between the reel portions and the respective wings is controlled. Operating the reel arms in this manner promotes improved harvesting as the wings are pivoted relative to the center frame portion of a draper header while also avoiding contact between the fingers of a reel and the cutterbar of a draper header.

In some implementations, a reel position is selected to define a first clearance between the reel, e.g., a reel portion, and a wing of the draper header at a first position of the wing, such as a droop position (e.g., a full droop position) and a second, different clearance at second, different position of the wing. For example, a reel position relative to a wing is selected to define a first clearance at a full droop position of a wing where the clearance between a reel portion and the associated wing tends to have a decreased clearance and a second clearance at a position of the wing that is other than full droop. In order to effectuate the different clearances at different positions, the present disclosure provides for detecting a position of the wings (e.g., an angular position of the wings) and altering, in response, a position of one or more of the reel arms relative thereto in order to maintain the desired clearance between the respective reel portions and wings. Further, because the wings are moveable independently from one another, in some implementations, the different reel portions are independently positionable relative to the respective wing to which the reel portion is adjacent by independent actuation of the reel arms. In other implementations, one or more of the reel arms are actuated together.

In other implementations, a plurality of clearances are selectively defined between a reel portion and an associated wing as the wing is moved over a range of motion. In some instances, a total range of motion of a wing, such as between a full droop position and a full bump position, is divided into a plurality of intervals. In other instances, a range of motion less than a full range of motion of a wing is divided into two or more intervals. Each of the intervals has a corresponding reel portion-to-wing clearance associated therewith. A position of one or more reel arms is altered to define the clearance between the reel portion and the associated wing to be the clearance associated with an interval in which the wing's present position is located.

For movement of a wing in a first interval, a reel arm may have a first selected position to provide the clearance associated with the first interval; for movement of the wing in a second interval, the reel arm may have a second selected position to provide the clearance associated with the second interval; and so on. In some implementations, a plurality of intervals are defined over a total amount of articulation of the wing, and a reel arm is defined to have a particular position for each of the intervals. The position of the reel arm provides for the desired clearance between a reel portion and a wing for the wing being at a position within the interval.

In some instances, the position of a reel arm to define a desired clearance between a reel portion and an associated wing having a position within an interval is defined by a lookup table that correlates each interval with a position of the reel arm. Thus, in some instances, a position of the wing is detected, an interval containing the position of the wing is determined, and a corresponding reel arm position is identified. The actuator associated with the reel arm is actuated to move the reel arm to the identified position. Using intervals having associated reel arm positions may avoid wear and tear on draper head components, such as actuators used to position the reel arms, because a wing is able to be moved within the range of positions defined by an interval without having to alter a position of the reel arms. As a result, continuous operation of actuators used alter a position of reel arms to adjust to continual movement of a wing is avoided.

Figure 7:
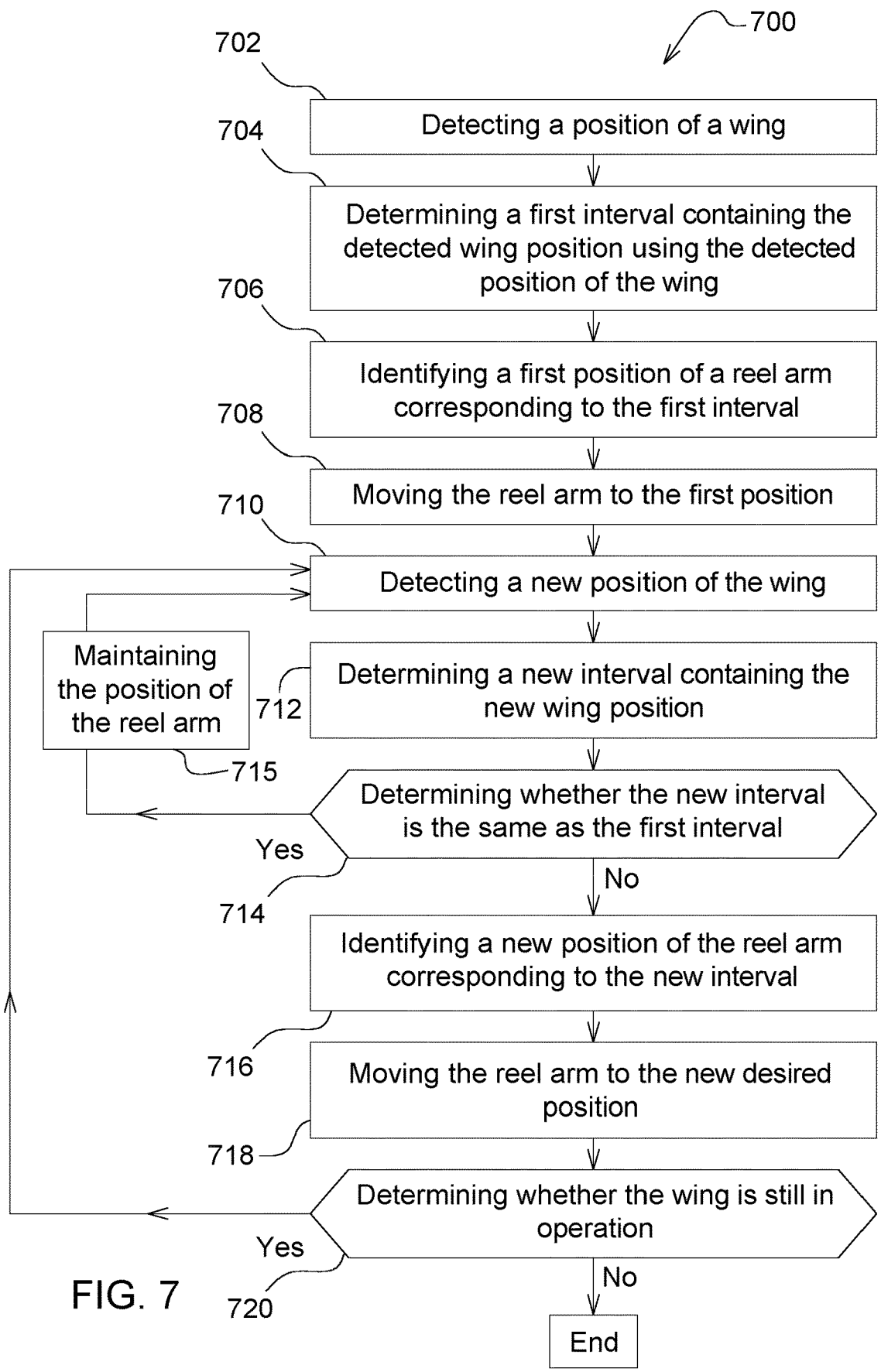
FIG. 7 is flowchart of an example method of for controlling a position of a reel arm of a draper header to provide a desired clearance between a reel or portion of a reel and a wing of the draper header, according to some implementations of the present disclosure.

FIG. 7 is a flowchart of an example method 700 for controlling a position of a reel arm, such as by using a lookup table. At 702, a position of a wing of a draper header is detected. For example, a position of the wing is detected using a wing position sensor, such as wing position sensor 324 and 326, to detect an amount an angular displacement of the wing relative to a datum, such as a center frame portion, e.g., center frame portion 302. At 704, an interval, of a plurality of intervals, containing the detected position of the wing (referred to as the "first interval") is determined using the detected position of the wing. At 706, a first position of the reel arm corresponding to the determined first interval is identified, and, at 708, the reel arm is moved to the identified first position. At 710, a new position of the wing is detected. At 712, a new interval containing the newly detected wing position is determined. At 714, a determination is made as to whether the new interval is the same as the first interval. If the new interval is the same as the first interval, then the position of the reel arm is maintained at 715 and the method 700 returns to 710 where a new position of the wing is detected. If the first interval and the new interval are not the same, then, at 716, a new position of the reel arm corresponding to the determined new interval is identified. At 718, the reel arm is moved to the new position. At 720, a determination is made as to whether the wing is continuing to move. If the wing is no longer moving, then the method 700 ends. If the wing is continuing to move, then the method 700 returns to 710.

In still other implementations, the position of a reel arm is adjusted in response to each change in position of a wing. For example, a position of a reel arm continuously adjusted in response to a changing position of a wing to adjust a clearance between the reel portion and an adjacent wing based on an instantaneously detected position of the wing. In some instances, each of the reel arms of a draper header is altered in this fashion. By altering a position of a reel arm in this way provides precise control of a clearance between a reel portion and a wing, thereby providing for improved efficiency of the draper header during a harvesting operation.

In some implementations, a particular position of a reel arm is correlated to a particular position of the wing. In some instances, the position of the reel arm is correlated to a position of the wing based on a mathematical relationship. For example, in some instances, a mathematical relationship receives, as an input, a position of the wing, e.g., an amount of angular displacement relative to a datum (e.g., a center frame portion of a draper header), and a position of the reel arm is output from the mathematical relationship. Consequently, positions of the reel portions are capable of being independently controlled to provide a defined clearance between the reel portion and the associated wing as a position of the wing changes.

Further adjustability of the reel portions is provided by adjustment not only of the outboard reel arms, such as reel arms 256 and 260, described earlier, but also a third reel arm, such as reel arm 258. The third reel arm is adjustable in order to alter a position of the inboard ends of the reel portions in response to changing positions of the wings. For example, in the context of the full bump position illustrated in FIG. 5, the third reel arm located between and coupled to the inward ends 322 of the reel portions 316 and 318 can be moved downwards in the direction of arrow 510 to improve engagement between the inward ends 322 of the reel portions 316 and 318 and the incoming crop. The position of this third reel arm is controlled to prevent engagement between the reel portions 316 and 318 and, more particularly, between fingers of the reel portions 316 and 318 and the cutterbar of the draper header 300. The position of the third reel arm is also controlled to prevent contact between the reel portions 316 and 318 and the hinges 312.

In some implementations, altering a position of the third reel arm disposed between the reel portions, such as reel portions 316 and 318, is performed in combination with altering a position of the outboard reel arms, such as reel arms 256 and 260. Referring again to FIG. 6, the third reel arm may be lowered in the direction of arrow 604 while the outboard reel arms may be raised in the direction of arrow 606 in order to improve an overall harvesting performance of the reel portions while avoiding contact between the reel portions and the cutterbar or other parts of the draper header. Thus, the reel arms are moveable independently to adjust a position of the reel portions to provide a desired clearance between the reel portions and another portion of the draper header, e.g., the wings or the cutterbar, in response to movement of the wings.

Figure 8:
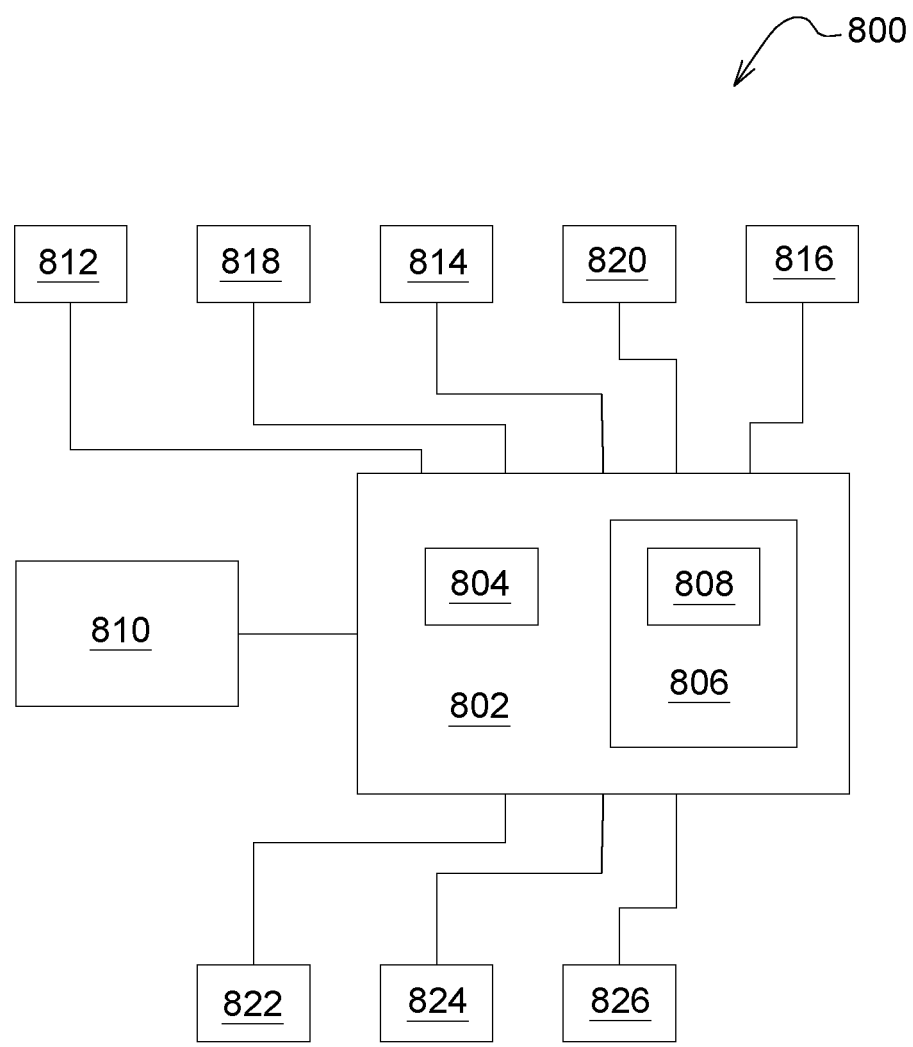
FIG. 8 an example system for controlling a position of reel arms of a draper header independently of one another to alter a position of a reel relative to wings of the draper header and adjust a clearance defined between the reel and the wings based on a position of the wings, according to some implementations of the present disclosure.

FIG. 8 is an example system 800 that operates to control a position of reel arms of a draper header independently of one another to alter a position of a reel relative to wings of the draper header to adjust a clearance defined between the reel and the wings based on a position of the wings. For the purposes of explanation, the example system 800 controls a draper header, such as draper header 200 or 300. However, the scope of the disclosure is not limited to the example draper headers 200 and 300. Consequently, control systems within the scope of the present disclosure encompasses controlling other types of headers, including draper headers having configurations different than the draper headers 200 and 300.

In some implementations, the system 800 operates to adjust one or more reel arms to form a first clearance when a wing of the draper header is at a first position and adjust the one or more reel arms to form a second clearance, different from the first clearance, when the wing is at a second position, different from the first position. In some implementations, the system 800 alters the reel arm positions to control a clearance between the reel and the wing based on a lookup table in a manner similar to that described in the context of FIG. 7. Thus, in some instances, the system 800 is operable to establish a clearance between a reel, such as reel portions of a reel, and a wing using intervals of a movement range of the wing. For example, as explained earlier, a clearance between a reel portion and a wing may be defined for each defined interval of movement of the wing. In some instances, one clearance is defined when a wing is in a first position, e.g., a full droop position, and a different clearance when the wing is in a second position, e.g., a position that is not a full droop position. In other instances, a plurality of intervals dividing a full range of motion of the wing (e.g., a full range of pivotal movement of the wing relative to a datum, such as a center frame portion) are defined, and a clearance associated for each interval is also defined. In some implementation, the system 800 detects a position of a wing, determines the interval in which the position of the wing resides, and identifies the clearance associated with the interval. The system 800 positions one or more reel arms to provide the identified clearance. In some implementations, rather than a clearance being associated with each interval, a position of one or more reel arms is associated with each interval. With the reel arms located at the reel arm position associated with an interval, a desired clearance is produced between the reel, e.g., a reel portion, and a wing. In still other implementations, the system 800 uses a mathematical relationship that outputs a selected reel arm position based on a detected wing position. In this way, the system 800 is operable to continuously adjust a clearance between a reel, e.g., reel portions of a reel, and wings of the draper header by independently controlling the positions of the reel arms of the draper header. The system 800 may control positioning of reel arms to adjust a clearance between the reel, e.g., the reel portions of the reel, at discrete intervals (e.g., upon the occurrence of a particular event, such as a wing of the draper header being displaced by a selected amount) or continuously based on an instantaneous position of a wing of the draper header.

The system 800 includes a controller 802. In some implementations, the controller 800 forms or includes a computer system, such as the computer system 900, described in more detail below. Additional details of the controller 802, such as processor 804 and memory 806, are described below in the context of computer system 900.

The controller 800 includes the processor 804 that is communicatively coupled to the memory 806. The memory 806 communicates with the processor 804 and is used to store programs and other software, information, and data. The processor 804 is operable to execute programs and software and receive information from and send information to the memory 806. Although a single memory 806 and a single processor 804 are illustrated, in other implementations, a plurality of memories, processors, or both may be used. Although the processor 804 and the memory 806 are shown as being local components of the controller 802, in other implementations, one or both of the processor 804 and memory 806 may be located remotely. Software 808, such as in the form of an application or program, is executed by the processor 804 to control operation of the system 800, as described in more detail below.

In the illustrated example, the system 800 includes an input device 808 used to provide input into the controller 802. The input device 810 is communicably coupled via a wired or wireless connection. In some instances, the input device 810 is a touch screen display that is communicably coupled to the controller 802. The touch screen display is operable to display information, such as information associated with the system 800. Further, a user can physically interact with the touch screen display, such as by touching a screen of the touch screen display, to provide input into the system 800. In some instances, the user interacts with the touch screen display via a graphical user interface (GUI) to provide input to the controller 800. GUIs included within the scope of the present disclosure are described in more detail below. In some instances, a separate display is communicably coupled to the controller 800 to output information to a user. Other types of input devices within the scope of the present disclosure include a keyboard, a mouse, or a joystick and are described in more detail below.

As mentioned earlier, the system 800 is configured to control a draper header similar to the draper header 200 or 300. The system 800 includes reel arm positions sensors 812, 814, and 816 that sense a position of corresponding reel arms, such as reel arms 234, 238, and 242. The system 800 also includes wing position sensors 818 and 820 that detect a position, e.g., an angular displacement, of a wing relative to a datum. For example, in some implementations, the wing position sensors 818 and 820 detect an amount of angular displacement of a wing, such as wing 204 and 206 of the draper header 200 or the wings 304 and 308 of draper header 300 relative to a center frame portion, such as center frame portion 202 or center frame portion 302. For example, the wing positions sensors 816 and 818 sense an angular displacement in the form of angles, such as angles 330 and 332 shown in FIGS. 5 and 6.

The system 800 also includes reel arm actuators 822, 824, and 826. The each of the reel arm actuators 822, 824, and 826 are associated with an individual reel arm. The controller 802 controls each reel arm actuator independently to alter a position of the reel arm to which each reel arm actuator is coupled. As a result, the controller is operable to individually alter a position of each reel arm using the reel arm actuators 822, 824, and 826. The reel arm actuators 822, 824, and 826 include, for example, hydraulic actuators (e.g., hydraulic cylinders); electrical actuators (e.g., electric linear actuators); mechanical actuators; and pneumatic actuators.

In operation, the controller 802 receives sensed position information from each wing position sensor 818 and 820. The controller 802 receives this wing position information and, using software 808, determines a desired position of each of the reel arms of the draper header in order to the define a desired clearance between each of the reel portions and the wing associated therewith. The controller 802 also receives a current position of each of the reel arms using the reel arm sensors 812, 814, and 816. Having information indicating a present position of each reel arm and a desired position of each reel arm determined based on the sensed wing positions and the desired positions of each reel arm determined using the wing position information, the controller 802 determines an amount by which each reel arm is to be moved in order to move the reel arms from the current position sensed by the reel arm sensors 812, 814, and 816 and the desired positions of the reel arms. The controller 802 sends signals to the respective reel arm actuators 822, 824, and 826 to move each reel arm individually from the current position of the respective reel arm to the desired position of the reel arm. In this way, the controller 802 is operable to individually control the reel arms in response to movement of the wings to position the reel portions relative to the associated wings to form a desired clearance between the associated reel portion and wing. The various ways in which the controller 802 is capable of individually controlling a position of the reel arms include those explained earlier. In other implementations, the controller 802 can also use other approaches to individually control the reel arms to produce a desired clearance between the reel and another part of the draper header, such as a wing or cutterbar of the draper header.

Without in any way limiting the scope, interpretation, or application of the claims appearing below, a technical effect of one or more of the example implementations disclosed herein is controlling a clearance between a reel or portion of a reel of a draper header relative to wings of the draper header. Another technical effect of one or more of the example implementations disclosed herein is that, by controlling a clearance between the reel and the wings of a draper header, the risk of contacting the reel or portion of the reel is another part of the draper header is reduced or eliminated. By reducing or eliminating the contact between the reel another portion of the draper header, a risk of damage to the draper header is also reduced or eliminated, such as the damage to or severing of fingers of the reel in the event the fingers come into contact with a cutterbar of the draper header. Another technical effect of one or more of the example implementations disclosed herein is improving a sweeping action of crop by the reel. By improving the sweeping action of the reel, a harvesting performance of the draper header is also improved.

Figure 9:
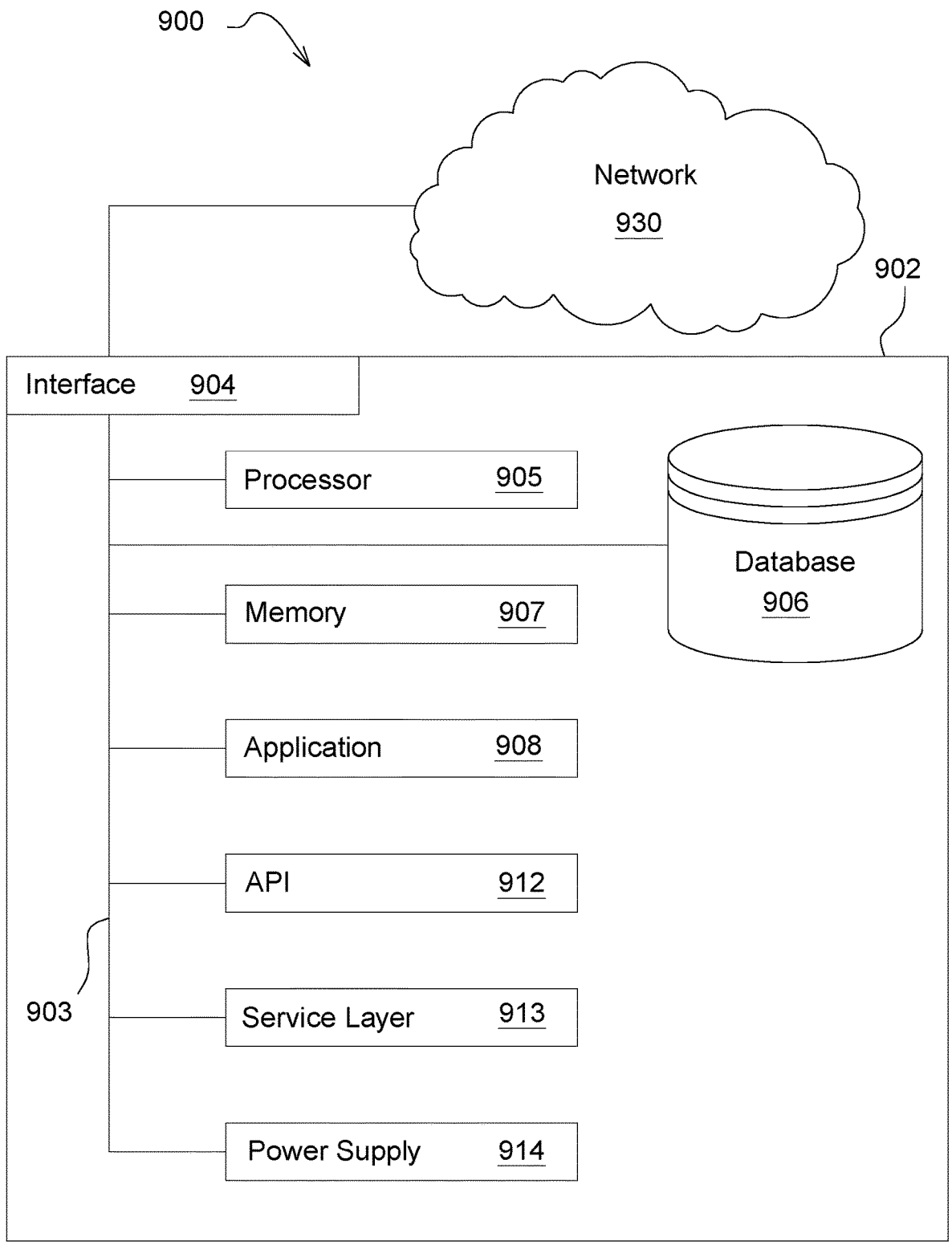
FIG. 9 is a block diagram illustrating an example computer system used to provide computational functionalities associated with described algorithms, methods, functions, processes, flows, and procedures as described in the present disclosure, according to some implementations of the present disclosure.

FIG. 9 is a block diagram of an example computer system 900 used to provide computational functionalities associated with described algorithms, methods, functions, processes, flows, and procedures described in the present disclosure, according to some implementations of the present disclosure. The illustrated computer 902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI).

The computer 902 can serve in a role as a client, a network component, a server, a database, a persistency, or components of a computer system for performing the subject matter described in the present disclosure. The illustrated computer 902 is communicably coupled with a network 930. In some implementations, one or more components of the computer 902 can be configured to operate within different environments, including cloud-computing-based environments, local environments, global environments, and combinations of environments.

At a high level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 903. In some implementations, any or all of the components of the computer 902, including hardware or software components, can interface with each other or the interface 904 (or a combination of both), over the system bus 903. Interfaces can use an application programming interface (API) 912, a service layer 913, or a combination of the API 912 and service layer 913. The API 912 can include specifications for routines, data structures, and object classes. The API 912 can be either computer-language independent or dependent. The API 912 can refer to a complete interface, a single function, or a set of APIs.

The service layer 913 can provide software services to the computer 902 and other components (whether illustrated or not) that are communicably coupled to the computer 902. The functionality of the computer 902 can be accessible for all service consumers using this service layer. Software services, such as those provided by the service layer 913, can provide reusable, defined functionalities through a defined interface. For example, the interface can be software written in JAVA, C++, or a language providing data in extensible markup language (XML) format. While illustrated as an integrated component of the computer 902, in alternative implementations, the API 912 or the service layer 913 can be stand-alone components in relation to other components of the computer 902 and other components communicably coupled to the computer 902. Moreover, any or all parts of the API 912 or the service layer 913 can be implemented as child or sub-modules of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 also includes a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

The application 908 can be an algorithmic software engine providing functionality according to particular needs, desires, or particular implementations of the computer 902 and the described functionality. For example, application 908 can serve as one or more components, modules, or applications. Further, although illustrated as a single application 908, the application 908 can be implemented as multiple applications 908 on the computer 902. In addition, although illustrated as internal to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system containing computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Described implementations of the subject matter can include one or more features, alone or in combination.

For example, in a first implementation, a computer-implemented method, including sensing, with a wing position sensor, a position of a wing of a draper header, the wing moveable within a range of movement, the range of movement defined between a first end point and a second end point; automatically actuating an actuator to move a portion of a reel to a first position relative to the wing when the sensed position of the first wing is at a first location within the range of movement; and automatically actuating an actuator to move the portion of the reel to a second position relative to the wing, the second position different than the first amount, when the sensed position of the wing is at a second location within the range of motion, different than the first location.

The foregoing and other described implementations can each, optionally, include one or more of the following features:

A first feature, combinable with any of the following features, wherein the actuator is coupled to a reel arm that extends between the wing and the portion of the reel.

A second feature, combinable with any of the previous or following features, wherein the range of movement includes a plurality of intervals; wherein automatically actuating an actuator to position a portion of a reel to a first position relative to the wing when the sensed position of the first wing is at a first location within the range of movement includes automatically actuating the actuator to move the portion of the reel to the first position when the sensed position of the wing is any of a first plurality of positions within a first interval of the plurality of intervals; and wherein automatically actuating an actuator to position the portion of the reel to a second position relative to the wing, different than the first amount, when the sensed position of the wing is at a second location within the range of motion, different than the first location, includes automatically actuating the actuator to move the portion of the reel to the second position when the sensed position of the wing is any of a second plurality of positions within a second interval of the plurality of intervals.

A third feature, combinable with any of the previous or following features, the method further including determining at least one of the first position or the second position, wherein determining at least one of the first position or the second position includes comparing the sensed position of the wing to the plurality of intervals; determining an interval of the plurality of intervals that encompasses the sensed position; and identifying a position to which the portion of the reel is to be moved relative to the wing associated with the determined interval.

A fourth feature, combinable with any of the previous or following features, the method further including generating a control signal to instruct the actuator to move the portion of the reel to the identified position, wherein the identified position defines one of the first position or the second position.

A fifth feature, combinable with any of the previous features, wherein identifying the position to which the portion of the reel is to be moved relative to the wing associated with the determined interval includes sensing a position of the portion of the reel; comparing the sensed position of the wing to the sensed position of the portion of the reel; and determining an amount by which the portion of the reel is to be moved relative to the wing based on the comparison in order to position the portion of the reel at the identified position.

In a second implementation, a non-transitory, computer-readable medium storing one or more instructions executable by a computer system to perform operations including: sensing, with a wing position sensor, a position of a wing of a draper header, the wing moveable within a range of movement, the range of movement defined between a first end point and a second end point; automatically actuating an actuator to move a portion of a reel to a first position relative to the wing when the sensed position of the first wing is at a first location within the range of movement; and automatically actuating an actuator to move the portion of the reel to a second position relative to the wing, the second position different than the first amount, when the sensed position of the wing is at a second location within the range of motion, different than the first location.

The foregoing and other described implementations can each, optionally, include one or more of the following features:

A first feature, combinable with any of the following features, wherein the actuator is coupled to a reel arm that extends between the wing and the portion of the reel.

A second feature, combinable with any of the previous or following features, wherein the range of movement includes a plurality of intervals; wherein automatically actuating an actuator to position a portion of a reel to a first position relative to the wing when the sensed position of the first wing is at a first location within the range of movement includes automatically actuating the actuator to move the portion of the reel to the first position when the sensed position of the wing is any of a first plurality of positions within a first interval of the plurality of intervals; and wherein automatically actuating an actuator to position the portion of the reel to a second position relative to the wing, different than the first amount, when the sensed position of the wing is at a second location within the range of motion, different than the first location, includes automatically actuating the actuator to move the portion of the reel to the second position when the sensed position of the wing is any of a second plurality of positions within a second interval of the plurality of intervals.

A third feature, combinable with any of the previous or following features, the operations further including determining at least one of the first position or the second position, wherein determining at least one of the first position or the second position includes comparing the sensed position of the wing to the plurality of intervals; determining an interval of the plurality of intervals that encompasses the sensed position; and identifying a position to which the portion of the reel is to be moved relative to the wing associated with the determined interval.

A fourth feature, combinable with any of the previous or following features, the operations further including generating a control signal to instruct the actuator to move the portion of the reel to the identified position, wherein the identified position defines one of the first position or the second position.

A fifth feature, combinable with any of the previous features, wherein identifying the position to which the portion of the reel is to be moved relative to the wing associated with the determined interval includes sensing a position of the portion of the reel; comparing the sensed position of the wing to the sensed position of the portion of the reel; and determining an amount by which the portion of the reel is to be moved relative to the wing based on the comparison in order to position the portion of the reel at the identified position.

In a third implementation, a computer-implemented system, comprising one or more processors and a non-transitory computer-readable storage medium coupled to the one or more processors and storing programming instructions for execution by the one or more processors, the programming instructions instructing the one or more processors to sense, with a wing position sensor, a position of a wing of a draper header, the wing moveable within a range of movement, the range of movement defined between a first end point and a second end point; automatically actuate an actuator to move a portion of a reel to a first position relative to the wing when the sensed position of the first wing is at a first location within the range of movement; and automatically actuate an actuator to move the portion of the reel to a second position relative to the wing, the second position different than the first amount, when the sensed position of the wing is at a second location within the range of motion, different than the first location The foregoing and other described implementations can each, optionally, include one or more of the following features:

A first feature, combinable with any of the following features, wherein the actuator is coupled to a reel arm that extends between the wing and the portion of the reel.

A second feature, combinable with any of the previous or following features, wherein the range of movement includes a plurality of intervals.

A third feature, combinable with any of the previous or following features, wherein the programming instructions instructing the one or more processors to automatically actuate an actuator to position a portion of a reel to a first position relative to the wing when the sensed position of the first wing is at a first location within the range of movement include programming instructions instructing the one or more processors to automatically actuate the actuator to move the portion of the reel to the first position when the sensed position of the wing is any of a first plurality of positions within a first interval of the plurality of intervals.

A fourth feature, combinable with any of the previous or following features, wherein the programming instructions instructing the one or more processors to automatically actuate an actuator to position the portion of the reel to a second position relative to the wing, different than the first amount, when the sensed position of the wing is at a second location within the range of motion, different than the first location, include programming instructions instructing the one or more processors to automatically actuate the actuator to move the portion of the reel to the second position when the sensed position of the wing is any of a second plurality of positions within a second interval of the plurality of intervals.

A fifth feature, combinable with any of the previous or following features, wherein the programming instructions further include programming instructions instructing the one or more processors to determine at least one of the first position or the second position, wherein the programming instruction instructing the one or more processors to determine at least one of the first position or the second position includes programming instructions instructing the one or more processors to compare the sensed position of the wing to the plurality of intervals; determine an interval of the plurality of intervals that encompasses the sensed position; and identify a position to which the portion of the reel is to be moved relative to the wing associated with the determined interval.

A sixth feature, combinable with any of the previous or following features, wherein the programming instructions further include programming instructions instructing the one or more processors to generate a control signal to instruct the actuator to move the portion of the reel to the identified position, wherein the identified position defines one of the first position or the second position.

A seventh feature, combinable with any of the previous features, wherein the programming instruction instructing the one or more processors to identify the position to which the portion of the reel is to be moved relative to the wing associated with the determined interval includes programming instructions instructing the one or more processors to sense a position of the portion of the reel; compare the sensed position of the wing to the sensed position of the portion of the reel; and determine an amount by which the portion of the reel is to be moved relative to the wing based on the comparison in order to position the portion of the reel at the identified position.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A system for adjusting a position of a reel of a draper header to maintain a desired clearance between a portion of the reel and another portion of the draper header, the system comprising:
   the draper header comprising:
      a base assembly comprising:
         a frame portion; and
         a first wing pivotably coupled to the frame portion, the first wing moveable over a range of movement, the range of movement having a first end and a second end;
      a cutterbar extending along a leading edge of the base assembly; and the reel pivotably coupled to the base assembly and comprising a first reel portion, wherein the range of motion includes a first portion corresponding to the wing being in a bump condition and a second portion corresponding to the wing being in a droop condition, wherein the first portion of the range of motion includes a plurality of bump positions of the first wing, wherein the second portion of the range of motion includes a plurality of droop positions of the first wing, wherein the first reel portion includes a first end positioned inboard and located proximate to the frame portion and a second end positioned outboard of the first end, and wherein the first reel portion is automatically movable towards the first wing in response to a sensed position of the first wing being at least one of the plurality of bump positions.

2. The system of claim 1, wherein the draper header further comprises:

a first reel arm disposed at the first end of the first reel portion; and a second reel arm disposed at the second end of the first reel portion, wherein at least the second reel arm is movable automatically to cause the first reel portion to move towards the first wing in response to the sensed position of the first wing being in the bump condition.

\* \* \* \* \*